(12) United States Patent
Ishidoshiro

(10) Patent No.: US 7,529,219 B2
(45) Date of Patent: May 5, 2009

(54) SYSTEM AND METHOD FOR ESTABLISHING A WIRELESS LAN COMMUNICATION

(75) Inventor: Takashi Ishidoshiro, Nagoya (JP)

(73) Assignee: Buffalo Inc., Nagoya-shi, Aichi-ken (JP)

( * ) Notice: Subject to any disclaimer, the term of this patent is extended or adjusted under 35 U.S.C. 154(b) by 740 days.

(21) Appl. No.: 11/052,172

(22) Filed: Feb. 7, 2005

(65) Prior Publication Data

US 2005/0190733 A1    Sep. 1, 2005

(30) Foreign Application Priority Data

Feb. 6, 2004    (JP) ............................. 2004-031228

(51) Int. Cl.
*H04Q 7/24* (2006.01)
(52) U.S. Cl. .................... 370/338; 370/328; 455/41.2; 455/435.1
(58) Field of Classification Search ................ 370/338
See application file for complete search history.

(56) References Cited

U.S. PATENT DOCUMENTS

| | | | |
|---|---|---|---|
| 5,901,362 A | 5/1999 | Cheung et al. | |
| 5,987,062 A | 11/1999 | Engwer et al. | |
| 6,144,855 A | 11/2000 | Slovin | |
| 6,332,077 B1 | 12/2001 | Wu et al. | |
| 2002/0007407 A1* | 1/2002 | Klein | 709/225 |
| 2002/0061748 A1 | 5/2002 | Nakakita et al. | |
| 2003/0119481 A1 | 6/2003 | Haverinen et al. | |

FOREIGN PATENT DOCUMENTS

| | | |
|---|---|---|
| EP | 1289198 A1 | 3/2003 |
| JP | 2002-252620 A | 9/2002 |
| JP | 2003-005641 A | 1/2003 |
| JP | 2005-175524 | 6/2005 |
| WO | WO-2004/015930 | 2/2004 |

OTHER PUBLICATIONS

Korean Office Action dated Aug. 18, 2006.
European Search Report.
Japanese Notice of the reason for refusal, dated Jan. 21, 2009.
European Search Report Apr. 26, 2005.
European Search Report Oct. 27, 2008.

* cited by examiner

*Primary Examiner*—Philip J Sobutka
(74) *Attorney, Agent, or Firm*—Yokoi & Co., U.S.A., Inc.

(57) ABSTRACT

The registering work of a wireless LAN terminal and a wireless LAN access point has been troublesome especially to beginners. According to the wireless LAN communication system of this invention, the client terminal judges the necessity of registering the communication profiles, and if necessary, executes the register processing with the wireless LAN access point, which simplifies the registering work by the user. Here, the system requires the wireless LAN access point to switch the normal mode into the register request-accepting mode, which makes it possible to prevent the register processing from being executed with unintentional client terminals. Therefore, it is possible to provide a wireless LAN communication system that facilitates the registering work and achieves the security at a satisfactory level.

8 Claims, 5 Drawing Sheets

FIG. 4

| Profile ID | Wireless LAN repeater | ESSID | Cipher system | Cipher key | Wireless channel | |
|---|---|---|---|---|---|---|
| 1 | A | XXXX··· | WEP | ○△○ | x | ----- |
| 2 | B | XYXX··· | WPA | △○○ | y | ----- |
| 3 | C | XYYX··· | WEP | △△○ | z | ----- |
| ----- | ----- | ----- | ----- | ----- | ----- | ----- |

SYSTEM AND METHOD FOR ESTABLISHING A WIRELESS LAN COMMUNICATION

BACKGROUND OF THE INVENTION

1. Field of the Invention

The present invention relates to a wireless LAN communication system, a wireless LAN communication method, and a wireless LAN communication program.

2. Description of the Related Art

In the conventional wireless LAN communication system, in order for a wireless LAN terminal to perform data communications with a new wireless LAN access point such as a wireless LAN repeater and a router, the user of the wireless LAN terminal has been required to register the communication profiles of the wireless LAN access point concerned. Registering the communication profiles involves inputting multiple setting items such as the identifier (for example, ESSID: Extended Service Set Identifier), security level, and frequency information and so forth of the wireless LAN access point, which is difficult and troublesome to beginners.

In contrast, there is a system proposed, in which both the wireless LAN terminal and the wireless LAN access point are provided with register starting switches, and when both the switches are valid, the register processing is executed between the wireless LAN terminal and the wireless LAN access point (refer to JPA-No. 408011/2003).

Although the above wireless LAN communication system can save inputting multiple setting items on the wireless LAN terminal side, the user of the wireless LAN terminal and the manager of the wireless LAN access point have to press the register starting switches on both sides, in which still remains troublesomeness.

SUMMARY OF THE INVENTION

The present invention has been made in view of the above problem, and it is an object of the invention to provide a wireless LAN communication system, a wireless LAN communication method, and a wireless LAN communication program, which facilitate the registering operations on both sides of the wireless LAN terminal and the wireless LAN access point.

In order to accomplish the above object, the invention relating to a first aspect recites the wireless LAN communication system including a wireless LAN access point and a wireless LAN terminal that are mutually capable of data communications by transmitting given radio waves with data superposed thereon.

The above wireless LAN terminal includes a profile list capable of storing multiple communication profiles of the wireless LAN access point, a communication device that performs data communications with the wireless LAN access point registered in the profile list based on the profile list, a unique signal receiving device that receives a unique signal native to the wireless LAN access point from the wireless LAN access point, a register requesting device that, when the unique signal received by the unique signal receiving device is one transmitted from the wireless LAN access point that is not registered in the communication profiles, transmits the register request to the wireless LAN access point concerned in response to the unique signal received, and a register processing device that, when the wireless LAN access point accepts the register request, executes the register processing with the wireless LAN access point concerned, and makes the profile list update the communication profiles of the wireless LAN access point concerned.

The above wireless LAN access point includes a unique signal transmitting device that transmits the unique signal native to the wireless LAN access point, and a register request accepting device that accepts the register request answered to the unique signal according to predetermined operations.

In the invention of the first aspect thus constructed, the wireless LAN communication system includes at least the wireless LAN access point and the wireless LAN terminal, and both are able to perform data communications with each other by transmitting radio waves with data superposed thereon. The wireless LAN terminal is provided with the profile list in which are stored multiple communication profiles of the wireless LAN access point. The communication device performs data communications with the wireless LAN access point based on the communication profiles stored in the profile list. The wireless LAN access point transmits a unique signal native to the wireless LAN access point, and the unique signal receiving device of the wireless LAN terminal receives the unique signal.

The register requesting device transmits a register request to the wireless LAN access point concerned in response to the received unique signal, when the received unique signal is one transmitted from the wireless LAN access point that is not registered in the communication profiles. The register request accepting device of the wireless LAN access point accepts the register request transmitted in response to the unique signal from the wireless LAN terminal. And, when the wireless LAN access point concerned accepts the register request, the register processing device of the wireless LAN terminal executes the register processing with the wireless LAN access point concerned. That is, the register processing device makes the profile list update the communication profiles of the wireless LAN access point concerned.

The system thus constructed makes it possible to perform the register processing between a non-registered wireless LAN access point and the wireless LAN terminal, and after completing the register processing, it becomes possible to perform the wireless LAN communication between the wireless LAN access point and the wireless LAN terminal. That is, the wireless LAN terminal judges whether the wireless LAN access point is non-registered or registered, and the wireless LAN terminal transmits the register request only when it is non-registered. Therefore, the user is relieved of judging the necessity of registering the wireless LAN terminal, and performing the register requesting operation on the wireless LAN terminal side. On the other hand, the wireless LAN access point is designed to accept the register request from the wireless LAN terminal, when the predetermined operations are made; and therefore, the wireless LAN access point is made not to execute the register processing of the non-registered wireless LAN terminals unconditionally. It is accordingly possible to prevent the register processing of unintentional wireless LAN terminals.

In the invention relating to a second aspect, the register request accepting device is designed to accept the register request from the wireless LAN terminal within a predetermined time after the unique signal is transmitted.

In the invention relating to the second aspect thus constructed, by accepting the register request within the predetermined time after the unique signal is transmitted, it is possible not to register unintentional wireless LAN terminals.

In the invention relating to a third aspect, the register request accepting device is designed to accept the register request received first after the unique signal is transmitted.

In the invention relating to the third aspect thus constructed, by accepting the register request received first after the unique signal transmitting device transmits the unique signal, it is possible not to register unintentional wireless LAN terminals.

The technique is not necessarily limited to a device having entity, in which the wireless LAN terminal judges the wireless LAN access point being non-registered and executes the register processing, which is also effective as the invention of the method, as the invention set forth in a fourth aspect.

The objects in which the present invention is embodied may be software and hardware, which can be varied appropriately. As an example, the invention set forth in a fifth aspect specifies the invention as a wireless LAN communication program. When the idea of the invention is embodied in the software of the wireless LAN communication system, the invention naturally exists on a recording medium containing such software, which is used in general. The recording medium may be a magnetic recording medium or a magneto-optical recording medium; or any type of recording media being developed in the future can be conceived as the same one.

With regard to the duplicating stage in the primary products and the secondary products, the idea of the invention exists in the same manner beyond question. Apart from the recording medium, when a communication line is used as the supply method, the invention is used in the communication line served as the transmission medium. Further, the wireless LAN communication method and the wireless LAN communication program can assume the constructions corresponding to the second and third aspects.

According to the invention relating to the first, fourth, and fifth aspects, it is possible to provide a wireless LAN communication system, wireless LAN communication method, and wireless LAN communication program, which facilitate the registering operations on both sides of the wireless LAN terminal and the wireless LAN access point.

According to the invention relating to the second and third aspects, it is possible to prevent the register processing of unintentional wireless LAN terminals.

Other and further objects, features and advantages of the invention will appear more fully from the following description.

BRIEF DESCRIPTION OF THE DRAWINGS

FIG. 4 is a table illustrating a profile list; and

DETAILED DESCRIPTION OF THE PREFERRED EMBODIMENTS

Figure 1:
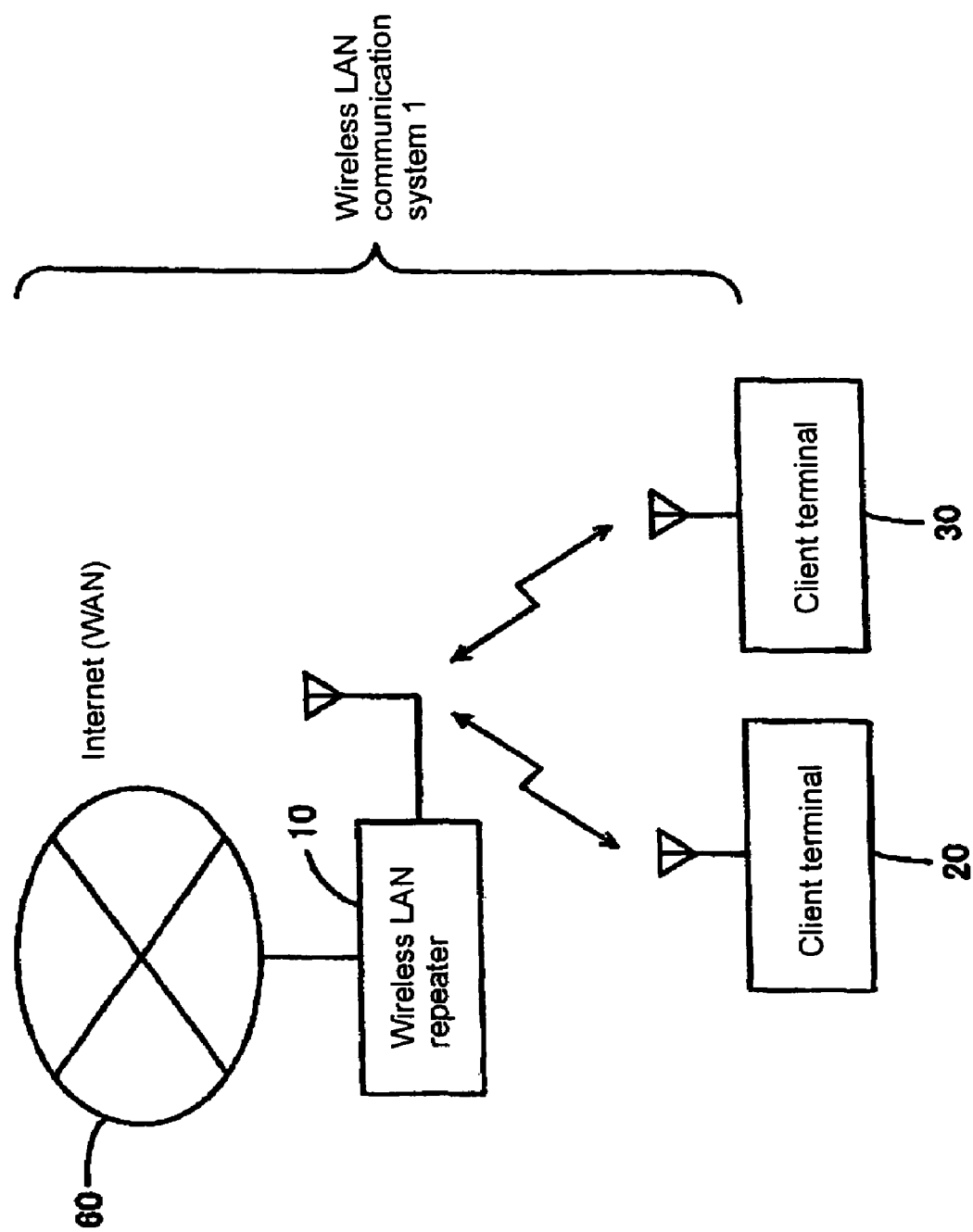
FIG. 1 illustrates a schematic construction of a wireless LAN communication system relating to the invention.

The preferred embodiments of the invention will be described according to the following order.
(1) Hardware construction of the wireless LAN communication system
(2) Operation of the wireless LAN communication system
(3) Summary
    (1) Hardware Construction of the Wireless LAN Communication System FIG. 1 illustrates a schematic construction of a wireless LAN communication system 1 relating to one embodiment of the invention. In the drawing, a wireless LAN access point 10 is connected to an Internet WAN 60 through a cable (wired). The wireless LAN access point 10 is capable of connecting itself to client terminals 20, 30, etc., by means of the wireless communication. Thereby, the client terminals 20, 30 become able to access the Internet WAN 60 through the wireless LAN access point 10, and to perform wireless data communications between the client terminal 20 and the client terminal 30.

Figure 2:
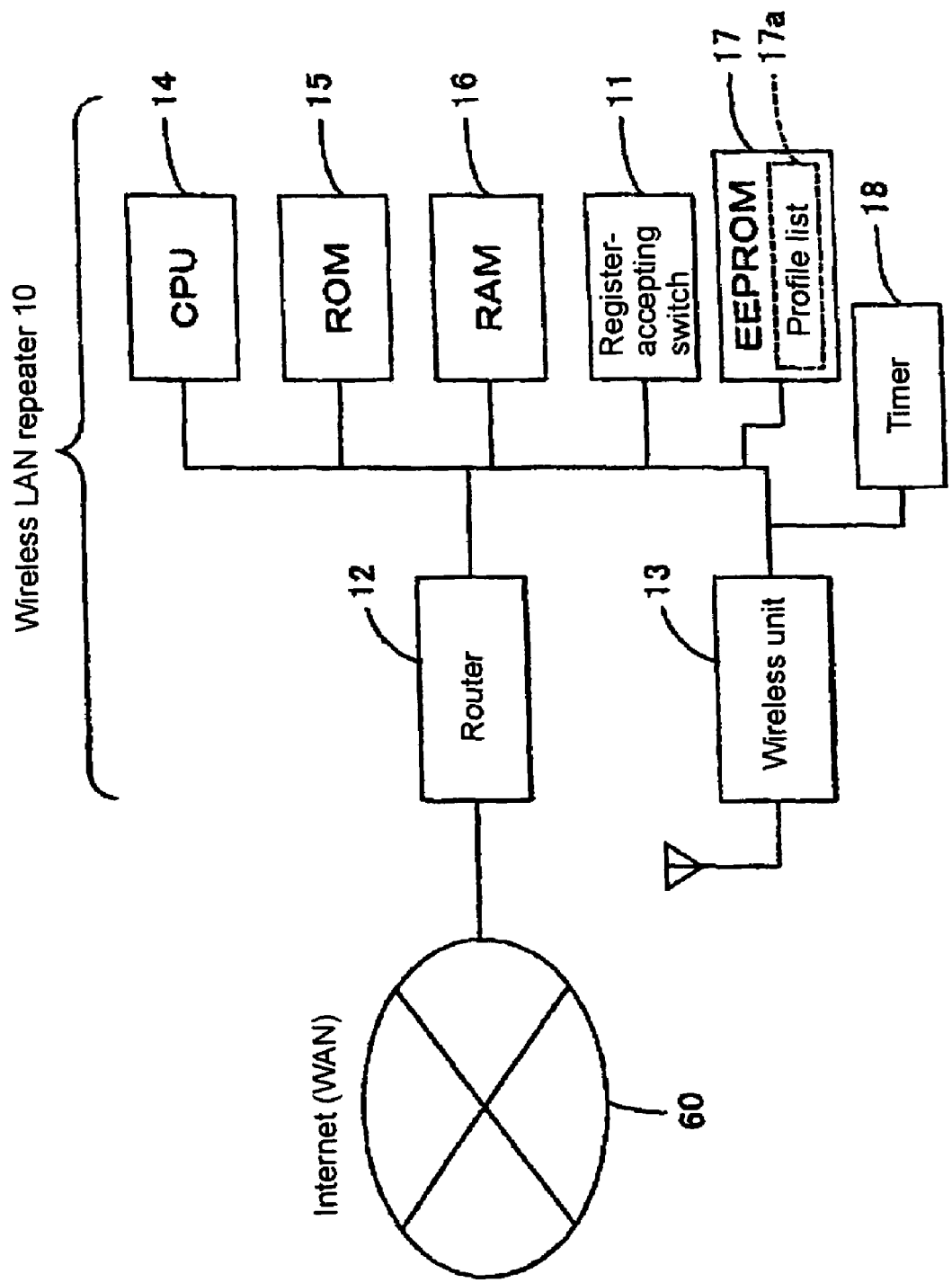
FIG. 2 illustrates a hardware block diagram of a wireless LAN access point.

FIG. 2 illustrates a schematic construction of the wireless LAN access point 10 by means of a block diagram. In the drawing, the wireless LAN access point 10 includes three interfacing devices, a register-accepting switch 11 switchable by the operation of a user, a router 12 to be connected to the external Internet through an optical fiber cable or the like, and a wireless unit 13 capable of the network connections with external wireless terminals through wireless media. A CPU 14 mediates data communications with network devices connected through the interfacing devices, while reading the firmware and data written into a ROM 15 and an EEPROM 17 as a nonvolatile memory, and appropriately accessing a RAM 16 to temporarily store the data therein.

The above interfacing devices can be implemented with general-purpose circuits. The wireless unit 13 is provided with an antenna, a base band processor (BBP), and an RF circuit and so forth, which are not illustrated. The wireless unit 13 transmits radio waves having electronic data superposed and restores the electronic data from the received radio waves. Here, this embodiment adapts itself to the standard IEEE802.11b and 11g, and the radio waves of 2.4 GHz band carry the electronic data having packets disassembled, etc.

Figure 3:
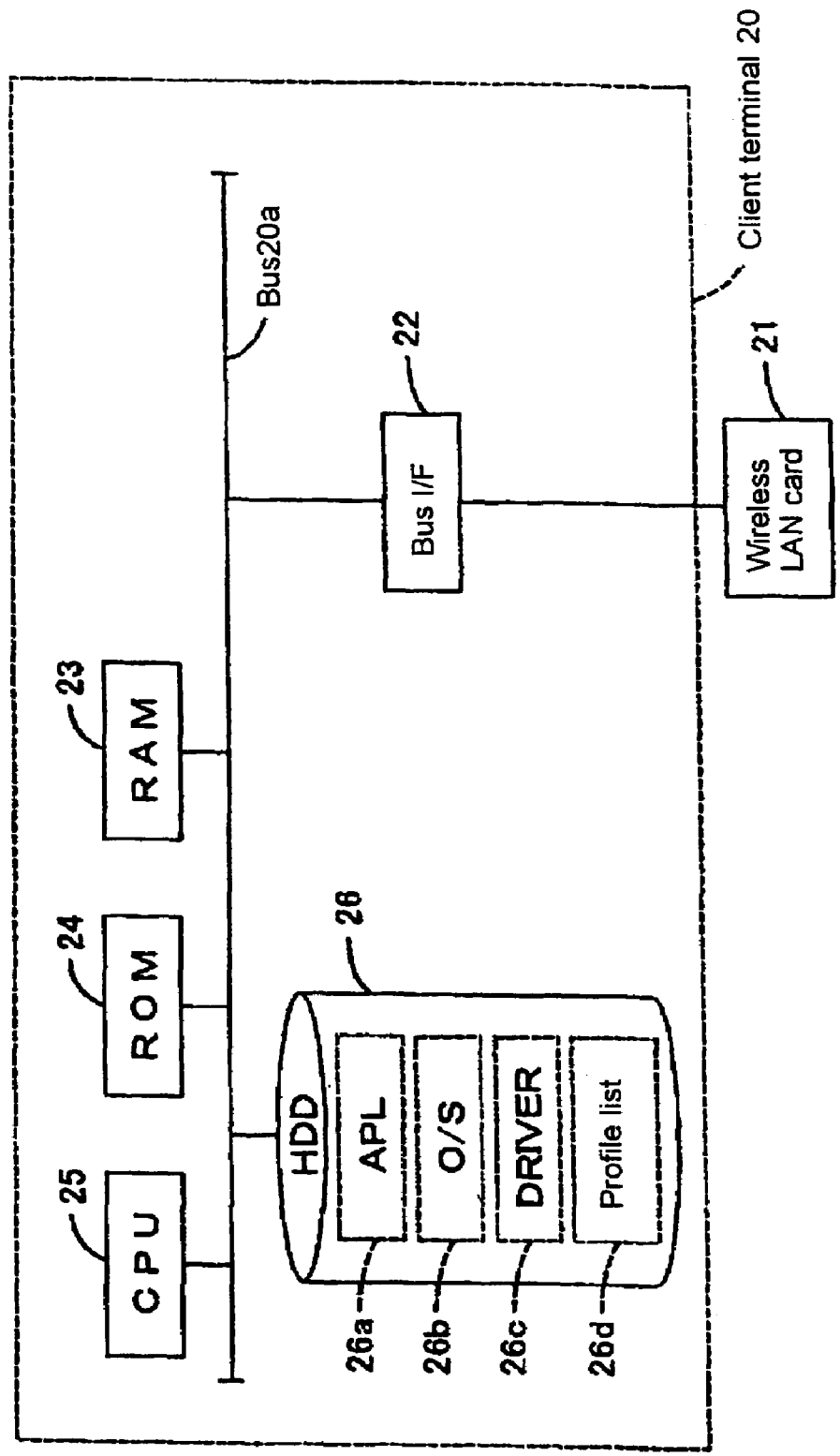
FIG. 3 illustrates a hardware block diagram of a client terminal.

FIG. 3 illustrates a hardware construction of the client terminal by means of a schematic block diagram. Here in this embodiment, the client terminal will be explained with a note-type personal computer (PC) having a wireless LAN card mounted thereon as an example. The client terminal to which the invention is applied is not limited to the note-type PC; it may be a PDA, a mobile telephone, or a home information device with the wireless communication function.

In FIG. 3, the client terminal 20 includes a bus 20a. A CPU 25, a ROM 24, a RAM 23, a bus interface (I/F) 22, and a hard disk (HDD) 26 and so forth are connected to the bus 20a. Further, to the bus 20a is also connected the input I/F that makes a display I/F, a mouse, and a keyboard usable, which are not illustrated. The HDD 26 stores an application program (APL) 26a, an operating system (OS) 26b, a communication driver 26c, and a profile list 26d, etc. The bus I/F 22 has a wireless LAN card 21 connected as the external connection device, and wireless LAN card 21 is also provided with an antenna, BBP, and RF circuit, etc.

FIG. 4 illustrates the profile list 26d with a table. In FIG. 4, with regard to profile IDs each allocated to the wireless LAN access points 10 each, predetermined setting items are registered. The setting items include the name of the wireless LAN access point 10 being the communication partner, the identifier ESSID unique to the wireless LAN access point 10, the cipher system and cipher key applied to the data communication with the wireless LAN access point 10, and the wireless channel used in the data communication with the wireless LAN access point 10, and so forth. The ESSID is the identifier unique to the wireless LAN access point, and the communication partner can be identified by the ESSID, thus preventing interferences, etc. However, the identifier is only needed to be the identifier unique to the wireless LAN access point 10, and the MAC address can also be used instead.

The cipher system is to encipher data so that exchanged packets cannot be read by an interceptor. For example, the WEP (Wired Equivalent Privacy) system is standardized in the IEEE802.11b and the WPA (Wi-Fi Protected Access) system is going to be adopted in the IEEE802.11i. The cipher key is the data of a specified length determined at random with an objective wireless LAN access point, and it is the key data required for enciphering and deciphering the data in conformity to the cipher system. Therefore, though the wireless LAN access point 10 is capable of using a common cipher system, as long as the cipher key is not set in advance, the communication cannot be performed. The wireless channel is the channel in case of a given frequency band is used in time division multiplexing.

By storing the required communication profiles corresponding to plural wireless LAN access points 10 each in the profile list 26d in this manner, the communication driver 26c becomes able to read the communication profiles of the wireless LAN access points 10 possible of data communications. Such a profile list is contained in the EEPROM 17 of the wireless LAN access point 10 as a profile list 17a, where the same setting items are registered for the client terminals 20 and so forth. Thereby, the wireless LAN access point 10 and the client terminal 20 can mutually perform data communications while applying the registered communication profiles to the registered partner, which makes it possible to perform data communications with high security and reliability.

(2) Operation of the Wireless LAN Communication System

Figure 5:
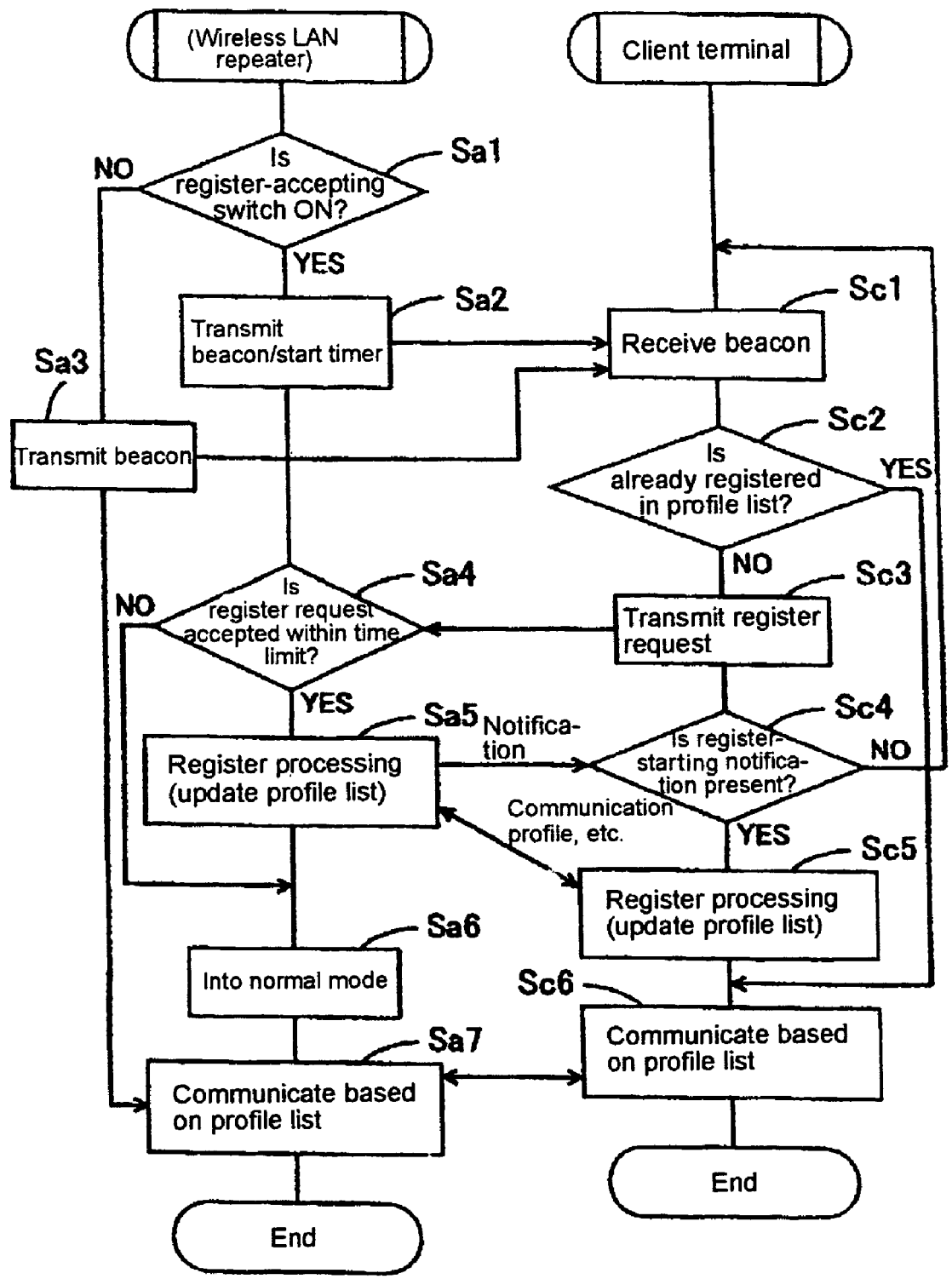
FIG. 5 is a flowchart illustrating the flow of a communication processing.

FIG. 5 illustrates a flow of the communication processing that is performed between the wireless LAN access point 10 and the client terminal 20 by using a flowchart. The wireless LAN access point 10 is provided with the register-accepting switch 11. At step Sa1, the wireless LAN access point 10 judges whether the register-accepting switch 11 is pressed on or not. If it is pressed on, the wireless LAN access point 10 executes the register request-accepting mode; and if not, the wireless LAN access point 10 executes the normal mode.

(a) Operation in the Normal Mode (a-1) Case of Being Already Registered

If the register-accepting switch 11 is not pressed on, the wireless LAN access point 10 transmits the ESSID that means the unique signal of the wireless LAN access point 10 as a beacon, at step Sa3. On the other hand, the client terminal 20 can receive the beacon at step Sc1. The client terminal 20 reads the ESSID being the identifier of the wireless LAN access point 10, and judges whether the read ESSID is registered in the profile list or not. If it is registered, the client terminal 20 will start the communication at step Sc6.

That is, the client terminal 20 is able to discriminate that the partner having transmitted the beacon concerned is the wireless LAN access point 10 of which communication profiles are already registered. Therefore, the client terminal 20 is able to perform data communications with the wireless LAN access point 10 with the registered communication profiles applied. In contrast, since the wireless LAN access point 10 stores the communication profiles of the partner client terminal 20 having started the communication in the profile list 17a, the wireless LAN access point 10 is able to apply the same communication profiles and perform data communications with the client terminal 20 concerned. In this manner, when the communication profiles of both parties are already registered in both the profile lists 26d, 17a, it is possible to execute the communication processing by using the registered communication profiles as they are.

In other words, when the wireless LAN access point 10 is in the normal mode, and the wireless LAN access point 10 and the client terminal 20 are already registered in the profile lists 17a and 26d, respectively, both parties are able to perform data communications between both based on the communication profiles registered in the profile lists 17a and 26d.

(a-2) Case of Being Not Registered

On the other hand, if the ESSID read at step Sc2 is one that is not registered in the profile list 26d, the client terminal 20 transmits the register request to the wireless LAN access point 10 concerned in response to the received ESSID at step Sc3. However, when the wireless LAN access point 10 is in the normal mode, the wireless LAN access point 10 does not accept this register request; accordingly, the client terminal 20 will not receive any response signal from the wireless LAN access point 10. Accordingly, the client terminal 20 judges that there is not a notification for starting the register from the wireless LAN access point 10 at step Sc4, returns the processing to step Sc1, and accepts receiving the beacon. That is, the processing Sc1 through Sc4 is repeated, until receiving the beacons from the other wireless LAN access points 10 being already registered in the client terminal 20 concerned, and until receiving the beacon from the wireless LAN access point 10 being not yet registered where the register request-accepting mode is in execution.

That is, when the wireless LAN access point 10 is in the normal mode, and the wireless LAN access point 10 and the client terminal 20 are not yet registered in the profile lists 17a and 26d, respectively, both parties cannot perform data communications between both. And, the register processing of both will not be started between the wireless LAN access point 10 and the client terminal 20.

(b) Operation in the Register Request-Accepting Mode (b-1) Case of Being Already Registered In the register request-accepting mode, the wireless LAN access point 10 transmits the ESSID in the first place, which is the identifier of the wireless LAN access point 10, as the beacon at step Sa2. At the same time, the timer 18 starts the operation. On the other hand, the client terminal 20 receives the beacon, and collates the ESSID at step Sc2. And, if the received ESSID is the one already registered, the client terminal 20 will start the communication by using the already registered communication profiles at step Sc6.

Since the client terminal 20 will not transmit the register request in this case, the register request is to be not accepted within a time limit in the wireless LAN access point 10 at step Sa4. The above time limit means the time limit of an elapsed time from the moment the wireless LAN access point 10 transmits the beacon at step Sa2, and a predetermined time is set in advance. The time limit is assumed in this embodiment to be one minute as an example. Here, the timer 18 is made to start operation at the same time as the beacon is transmitted at step Sa2, which makes it possible to attain the elapsed time from the moment the beacon is transmitted.

Since the register request will not be accepted until one minute elapses from the moment the beacon is transmitted, the wireless LAN access point 10 moves to the normal mode at step Sa6, and executes the communication with the client terminal 20 at step Sa7. That is, both the wireless LAN access point 10 and the client terminal 20 are put into the state possible of data communications by using the already registered communication profiles, and both parties can perform data communications between both accordingly.

In other words, when the wireless LAN access point 10 is in the register request-accepting mode, and the wireless LAN access point 10 and the client terminal 20 are already registered in the profile lists 17a and 26d, respectively, both parties move to the normal mode after the predetermined time limit and become able to perform data communications between both.

(b-2) Case of Being Not Registered

On the other hand, if the ESSID read at step Sc2 is one that is not registered in the profile list 26d, the client terminal 20 transmits the register request to the wireless LAN access point 10 concerned in response to the received ESSID at step Sc3. Then, the wireless LAN access point 10 in the register request-accepting mode executes the register processing of this register request at step Sa5. Here, even if the time limit of one minute does not elapse at this moment, the wireless LAN access point 10 forcibly executes the register processing at step Sa5. That is, if the latest register request is accepted, the register requests thereafter will not be accepted regardless of the time limit.

In the register processing that the wireless LAN access point 10 executes at step Sa5, first the wireless LAN access point 10 transmits a notification of starting the register processing to the client terminal 20. As the client terminal 20 receives the notification at step Sc4, the wireless LAN access point 10 executes the register processing cooperatively with the client terminal 20. The register processing executes the arrangement relating to the communication profiles necessary for the communication, such as the ESSID, cipher system, cipher key, and wireless channel, etc., the transfer of the driver files necessary for the communication, and the installment of the programs. The register processing updates the communication profiles in the profile lists 17a, 26d, which are arranged by both the wireless LAN access point 10 and the client terminal 20, whereby the communication based on the same communication profiles becomes possible thereafter. In concrete, the setting items of the wireless LAN access point 10 concerned are added to the profile list 26d as shown in FIG. 4.

As the wireless LAN access point 10 and the client terminal 20 complete the register processing of both, the wireless LAN access point 10 moves to the normal mode at step Sa7. Accordingly, the client terminal 20 is able to perform data communications with the wireless LAN access point 10 at step Sc6.

Here, it is possible to make the contents of the beacon transmitted in the register request-accepting mode at step Sa2 differ from the contents of the beacon transmitted in the normal mode. Thereby, the client terminal 20 is able to recognize the presence of the wireless LAN access point 10 capable of accepting the register request, by identifying the beacon.

That is, when the wireless LAN access point 10 is in the register request-accepting mode, and the wireless LAN access point 10 and the client terminal 20 are not yet registered in the profile lists 17a and 26d, respectively, both parties execute the register processing to move to the normal mode after the register processing, where both parties become able to perform data communications between both.

(3) Summary

According to the wireless LAN communication system thus described, it is possible to perform the register processing of the communication profiles, which is easy to operate and is difficult to cause problems on the security. When a non-registered client terminal 20 moves to a communication-possible area with the wireless LAN access point 10, if the wireless LAN access point 10 is in the normal mode, the register processing will not be executed as described in (a-2). In order for the non-registered client terminal 20 to execute the register processing, it is necessary that the wireless LAN access point 10 is in the register request-accepting mode, as described in (b-2). The wireless LAN communication system thus constructed prevents the register processing from being executed to unintentional client terminals 20, which makes it possible to prevent network-intrusions from fraudulent client terminals 20.

To execute the register processing needs to bring the wireless LAN access point 10 into the register request-accepting mode, which needs to make the register-accepting switch 11 ON. If the system is designed to request the password of the system manager when making the register-accepting switch 11 ON, for example, it will make impossible for the intruders to switch the mode into the register request-accepting mode. Accordingly, it is possible to prevent the register processing from being executed to the fraudulent client terminals 20 that the system manager does not intend. Here, the register-accepting switch 11 may be a mechanical switch, or it may be a switch implemented on software.

On the other hand, when the register processing for a non-registered client terminal 20 is executed to the wireless LAN access point 10, the client terminal 20 will not demand the user to perform any operation, as described in (b-2). That is, the system is made such that the client terminal 20 judges whether the client terminal 20 is already registered or non-registered by itself, and if it is non-registered, the register processing is executed. Therefore, the user is not needed to perform any operation to the client terminal 20. Thus, the registering work does not become complicated. As described in (a-1) and (b-1), when the client terminal 20 is already registered to the wireless LAN access point 10, the system judges it and makes the client terminal 20 use the already-registered communication profiles. Accordingly, the user is able to utilize the wireless LAN access point 10 without performing any operation.

When the wireless LAN access point 10 accepts the register request, the limitation is made to accept only the register request that is received within the predetermined time limit and is most lately received. Whatever the method of the above limitation maybe, it is possible to make only the client terminal 20 within the communication-possible area execute the register processing, immediately after the wireless LAN access point 10 makes the register-accepting switch 11 ON. That is, if the system is made such that the system manager confirms the client terminal 20 being within the communication-possible area and presses the register-accepting switch 11 ON, it is possible to make only the client terminal 20 that desires the registering execute the register processing. Therefore, it is possible to prevent unintentional client terminals 20 from being registered without permission.

As described above, according to the wireless LAN communication system 1 relating to this invention, the client terminal 20 judges the necessity of registering the communication profiles, and if necessary, executes the register processing with the wireless LAN access point 10, which simplifies the registering work by the user. Here, the system requires the wireless LAN access point 10 to switch the normal mode into the register request-accepting mode, which makes it possible to prevent the register processing from being executed with unintentional client terminals 20. Therefore, it is possible to provide a wireless LAN communication system that facilitates the registering work and achieves the security at a high and satisfactory level.

The foregoing invention has been described in terms of preferred embodiments. However, those skilled, in the art will recognize that many variations of such embodiments exist. Such variations are intended to be within the scope of the present invention and the appended claims.

What is claimed is:

1. A system for establishing a wireless LAN communication between a wireless LAN access point and a wireless LAN terminal, comprising:
   the wireless LAN access point having a first communication profile list;
   the wireless LAN terminal having a second communication profile list;
   the first and the second communication profile lists include a listing of communication profiles that define one or more communication link protocols;
   the wireless LAN access point further including a register-accepting mechanism for enabling updating of the first communication profile list and the second communication profile list to add a new communication profile to the listing of communication profiles;
   the wireless LAN access point determining if the register-accepting mechanism is in one of a normal mode and a register request-acceptance mode;
   if the wireless LAN access point determines that the register-accepting mechanism is in the register request-acceptance mode, the wireless LAN access point transmits a communication protocol signal from the first communication profile list to the wireless LAN terminal, and commences operation of a timer;
   the wireless LAN terminal receives the communication protocol signal, and determines if the communication protocol signal is registered in the second communication profile list;
   if the wireless LAN terminal determines that the communication protocol signal is not registered in the second communication profile list, the wireless LAN terminal transmits a register request signal to the wireless LAN access point to commence updating process of the first communication profile list and the second communication profile list;
   the wireless LAN access point receives the register request signal and determines if the register request signal is received within a predetermined time after the operation of the timer commenced; if the wireless LAN access point determines that the register request signal is received within the predetermined time after the operation of the timer commenced, the wireless LAN access point responds to the register request signal by transmitting a notification signal to the wireless LAN terminal;
   if the wireless LAN terminal determines that the notification signal from the wireless LAN access point is received, the first communication profile list and the second communication profile list are updated, the wireless LAN access point sets the mode of the register-accepting mechanism to the normal mode, and communication is established between the wireless LAN access point and the wireless LAN terminal based on an updated communication protocol signal.

2. The system for establishing a wireless LAN communication between a wireless LAN access point and a wireless LAN terminal as set forth in claim 1, wherein:
   if the wireless LAN terminal determines that the communication protocol signal is registered in the second communication profile list, communication is established between the wireless LAN access point and the wireless LAN terminal based on the communication protocol signal, after the wireless LAN access point determines that no register request signal is received from the wireless LAN terminal within the predetermined time after the operation of the timer commenced, and, further, the wireless LAN access point sets the mode of the register-accepting mechanism to the normal mode.

3. The system for establishing a wireless LAN communication between a wireless LAN access point and a wireless LAN terminal as set forth in claim 1, wherein:
   if the wireless LAN access point determines that the register-accepting mechanism is in normal mode, the wireless LAN access point transmits the communication protocol signal from the first communication profile list to the wireless LAN terminal;
   the wireless LAN terminal receives the communication protocol signal, and determines if the communication protocol signal is registered in the second communication profile list;
   if the wireless LAN terminal determines that the communication protocol signal is registered in the second communication profile list, communication is established between the wireless LAN access point and the wireless LAN terminal based on the communication protocol signal.

4. The system for establishing a wireless LAN communication between a wireless LAN access point and a wireless LAN terminal as set forth in claim 1, wherein:
   if the wireless LAN access point determines that the register-accepting mechanism is in normal mode, the wireless LAN access point transmits the communication protocol signal from the first communication profile list to the wireless LAN terminal;
   if the wireless LAN terminal determines that the communication protocol signal is not registered in the second communication profile list, the wireless LAN terminal transmits the register request signal to the wireless LAN access point to commence updating process of the first communication profile list and the second communication profile list;
   the wireless LAN access point receives the register request signal and determines if the register request signal is received within a predetermined time; if the wireless LAN access point determines that the register request signal is not received within a predetermined time, the wireless LAN access point does not respond to the register request signal, does not transmit a notification signal, and the register-accepting mechanism is set to a normal mode;
   if the wireless LAN terminal determines that the notification signal from the wireless LAN access point is not received regarding the updating, the wireless LAN terminal awaits for an other communication protocol signal.

5. A method for establishing a wireless LAN communication between a first device and a second device, comprising:
   providing a first communication profile list;
   providing a second communication profile list;
   the first and the second communication profile lists include a listing of communication profiles that define one or more communication link protocols;
   enabling updating of the first communication profile list and the second communication profile list by an addition of a new communication profile by determining if a register-accepting mechanism is in one of a normal mode and a register request-acceptance mode;
   if the register-accepting mechanism is in the register request-acceptance mode, transmitting a communication protocol signal from the first communication profile list and commencing operation of a timer;
   determining if the communication protocol signal is registered in the second communication profile list;

if the communication protocol signal is not registered in the second communication profile list, transmitting a register request signal to commence updating process of the first communication profile list and the second communication profile list;

determining if the register request signal is received within a predetermined time after the operation of the timer commenced; if the register request signal is received within the predetermined time after the operation of the timer commenced, responding to the register request signal by transmitting a notification signal;

if the notification signal is received, updating the first communication profile list and the second communication profile list, setting the mode of the register-accepting mechanism to the normal mode, and establishing communication between the first device and the second device based on an updated communication protocol signal.

6. The method for establishing a wireless LAN communication between a first device and a second device as set forth in claim 5, wherein:

if the communication protocol signal is registered in the second communication profile list, establishing communication between the first device and the second device based on the communication protocol signal after determining that no register request signal is received within the predetermined time after the operation of the timer commenced, and, further, after setting the mode of the register-accepting mechanism to the normal mode.

7. The method for establishing a wireless LAN communication between a first device and a second device as set forth in claim 5, wherein:

if register-accepting mechanism is in normal mode, transmitting the communication protocol signal from the first communication profile list, and determining if the communication protocol signal is registered in the second communication profile list;

if the communication protocol signal is registered in the second communication profile list, establishing communication between the first device and the second device based on the communication protocol signal.

8. The method for establishing a wireless LAN communication between a first device and a second device as set forth in claim 5, wherein:

if register-accepting mechanism is in normal mode, transmitting the communication protocol signal from the first communication profile list, and determining if the communication protocol signal is registered in the second communication profile list;

if the communication protocol signal is not registered in the second communication profile list, transmitting the register request signal to commence updating process of the first communication profile list and the second communication profile list;

determining if the register request signal is received within a predetermined time; if the register request signal is not received within a predetermined time, setting the register-accepting mechanism to the normal mode, and awaiting for an other communication protocol signal.

* * * * *